Oct. 10, 1950  W. P. GALLAGHER  2,525,029
PINION FORMING MACHINE
Filed Dec. 28, 1946  5 Sheets-Sheet 1
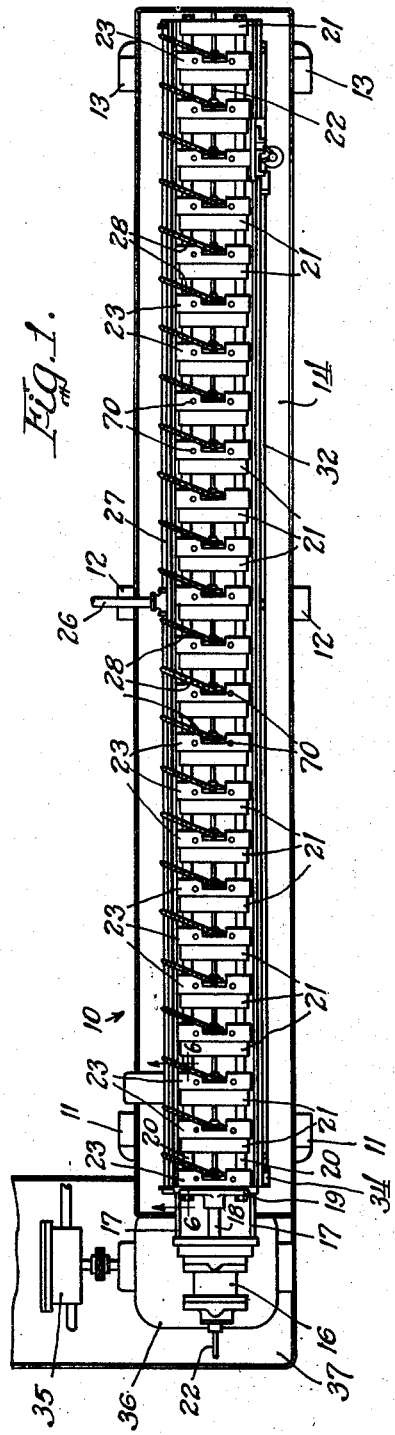
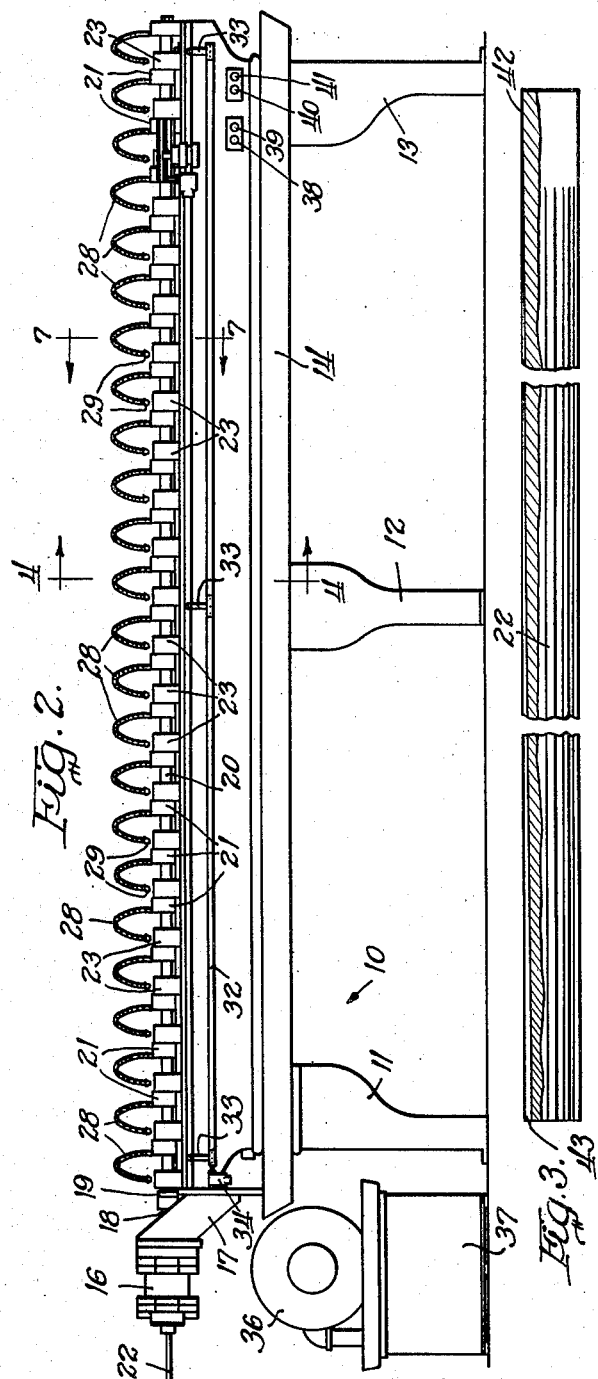
Inventor:
William P. Gallagher
By Brown, Jackson, Boettcher
& Dienner
Attys Oct. 10, 1950     W. P. GALLAGHER     2,525,029
PINION FORMING MACHINE
Filed Dec. 28, 1946     5 Sheets-Sheet 2
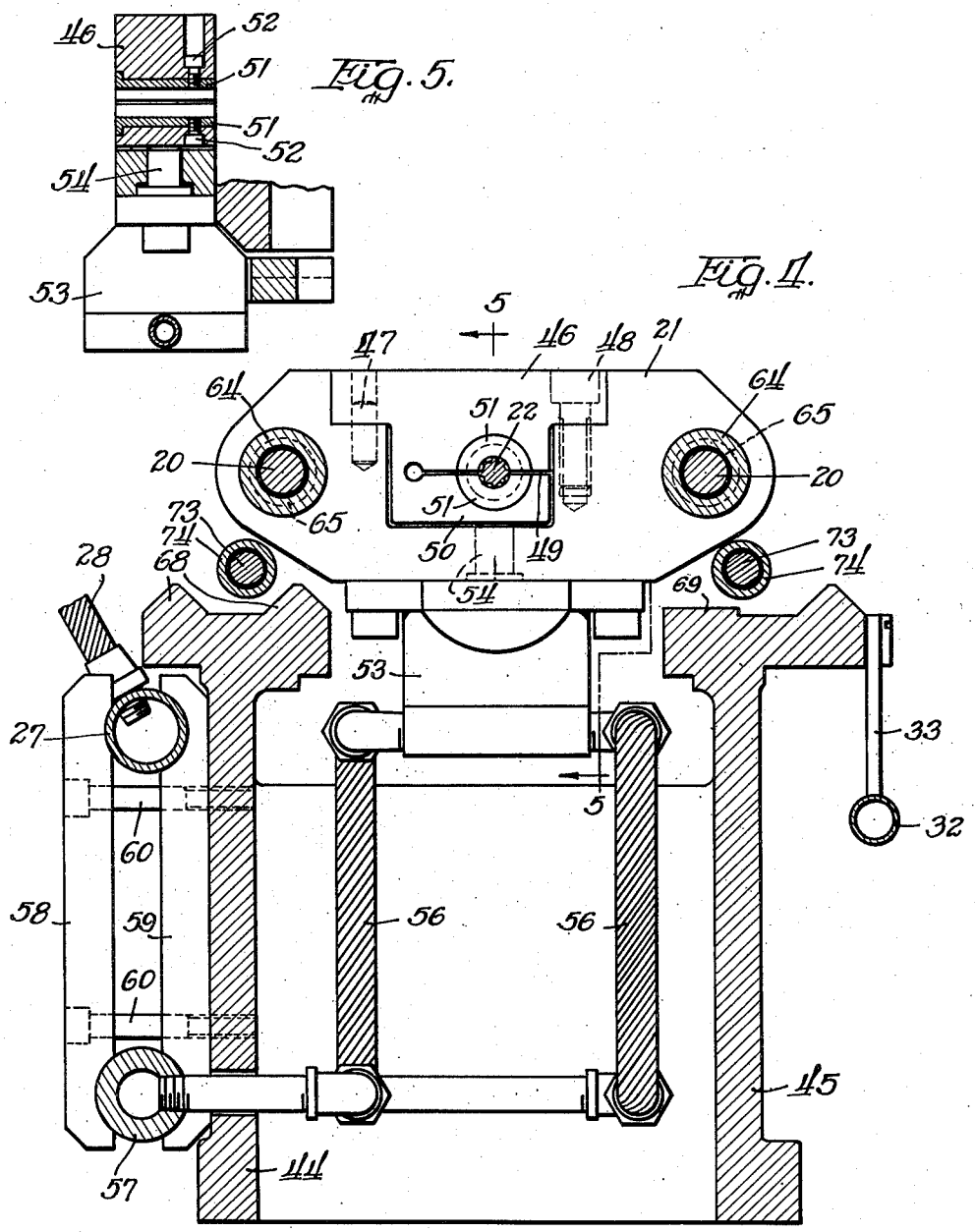
Inventor:
William P. Gallagher
By Brown, Jackson, Boettcher & Dienner
Attys.

Oct. 10, 1950 — W. P. GALLAGHER — 2,525,029
PINION FORMING MACHINE
Filed Dec. 28, 1946 — 5 Sheets-Sheet 3
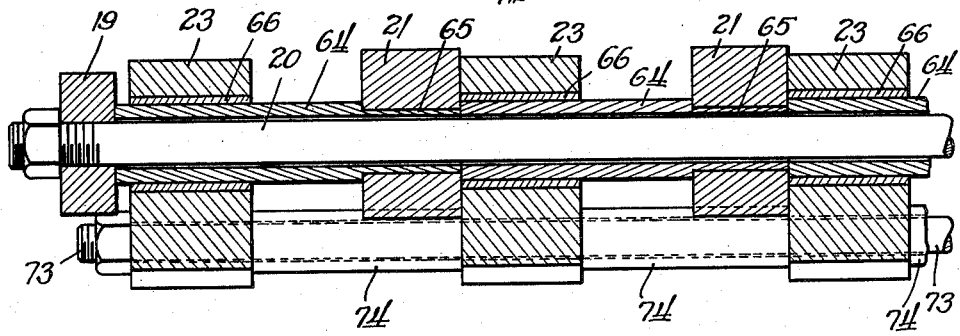
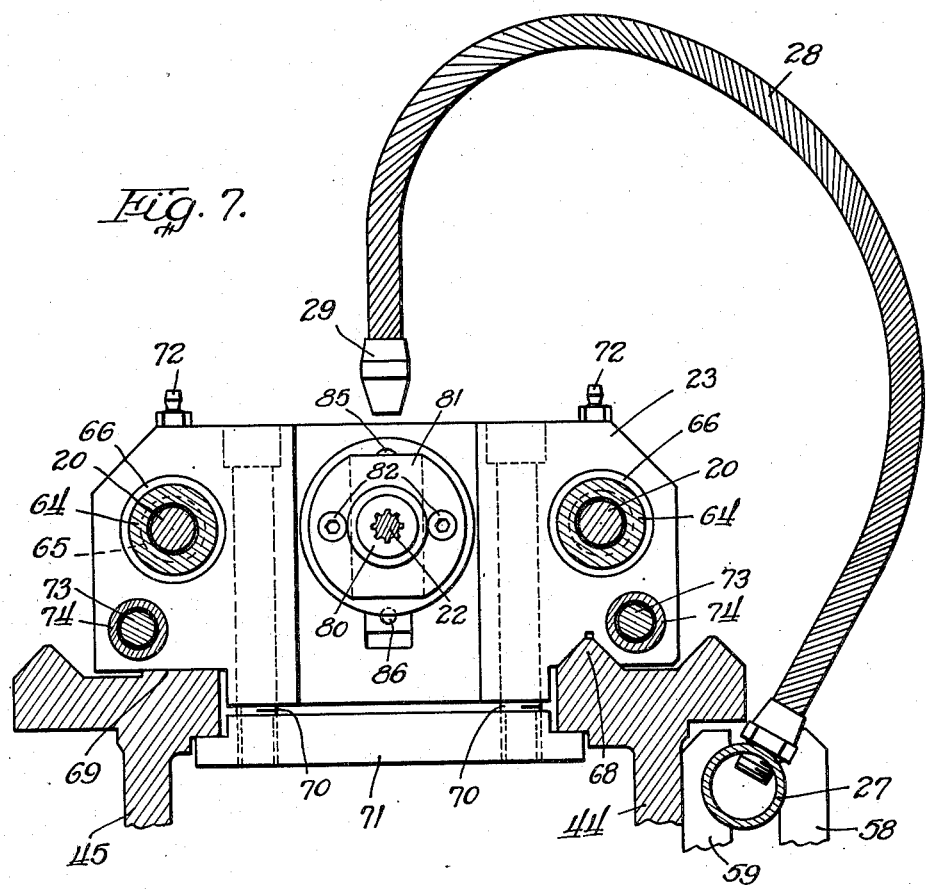
Inventor
William P. Gallagher.
By Brown, Jackson, Boettcher & Dienner
Attys.

Oct. 10, 1950 W. P. GALLAGHER 2,525,029
PINION FORMING MACHINE
Filed Dec. 28, 1946 5 Sheets-Sheet 4
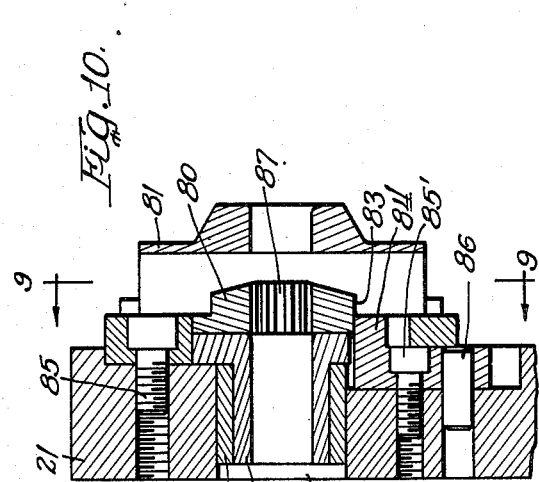
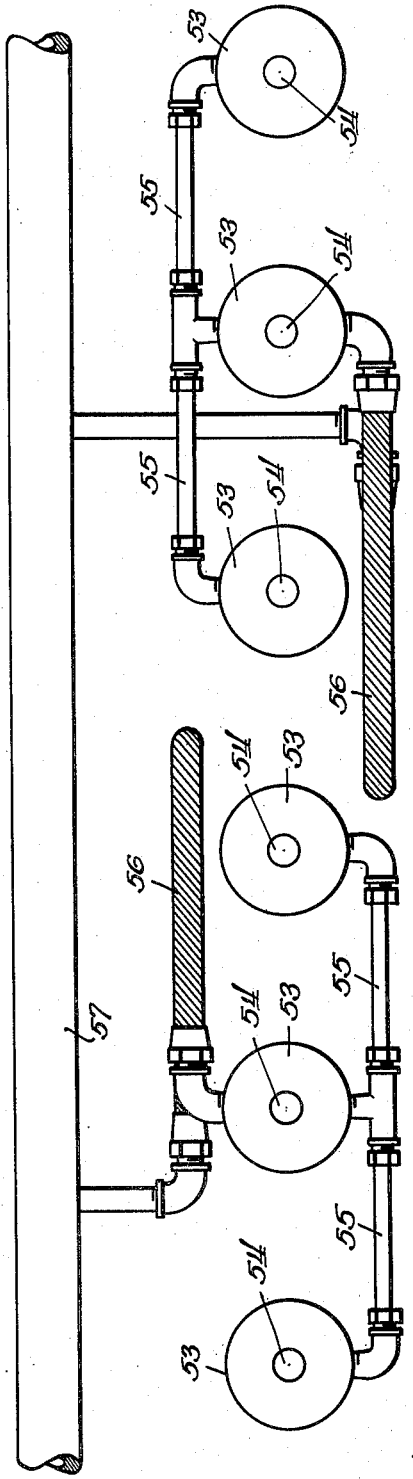
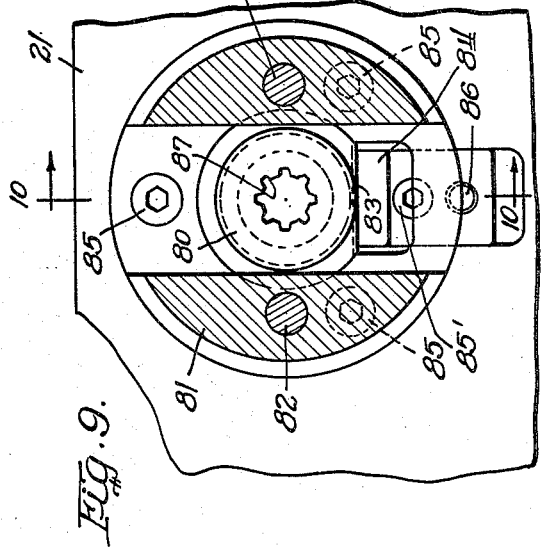
Inventor
William P. Gallagher
By Brown, Jackson, Boettcher
+ Dienner
Attys.

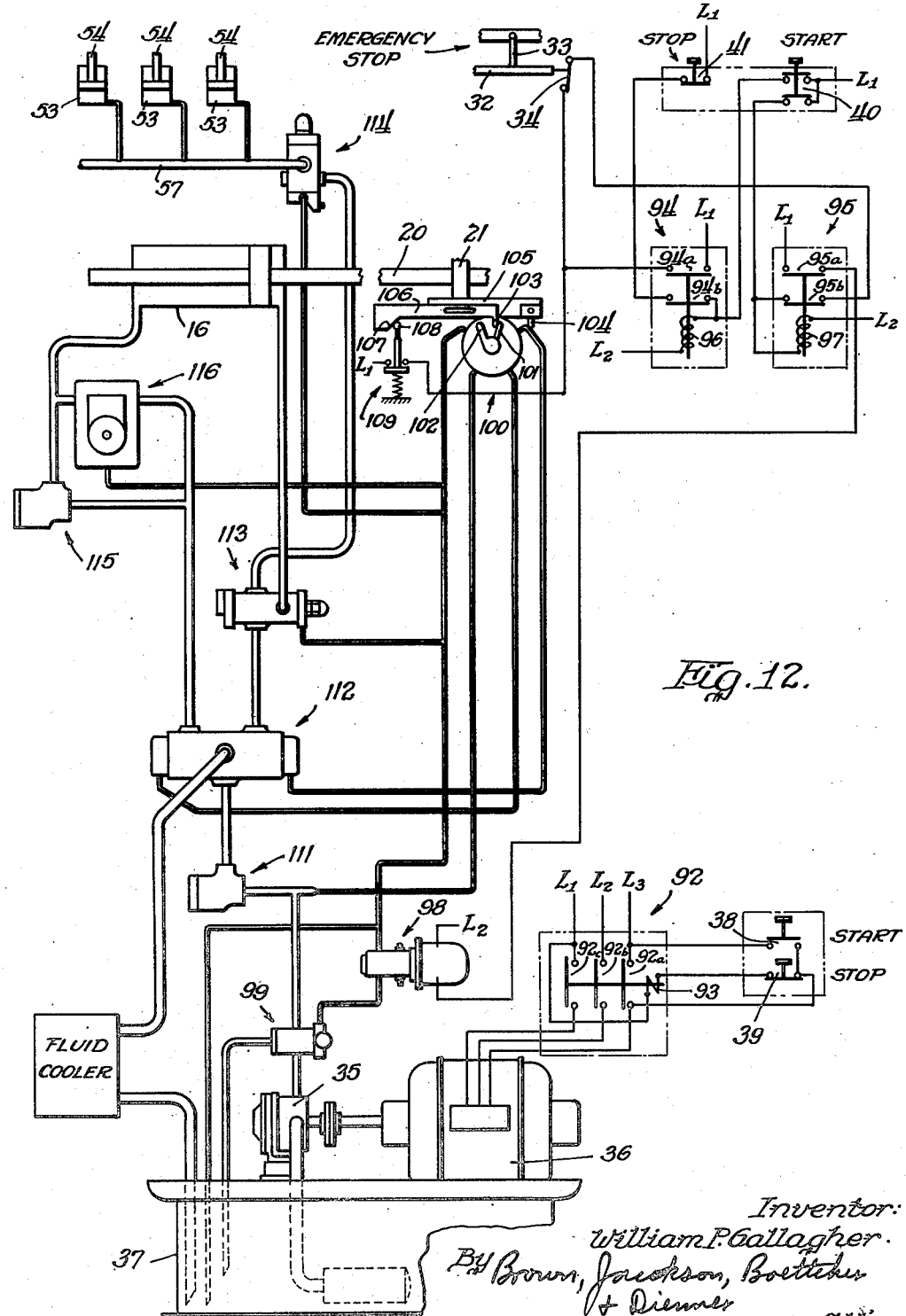

Patented Oct. 10, 1950

2,525,029

UNITED STATES PATENT OFFICE 2,525,029

PINION FORMING MACHINE

William P. Gallagher, Chicago, Ill., assignor to International Register Company, Chicago, Ill., a corporation of Illinois Application December 28, 1946, Serial No. 718,946

4 Claims. (Cl. 90—10)

My invention relates, generally, to broaching machines and it has particular relation to multiple broach machines for cutting pinion teeth or the like in round rods of indeterminate lengths.

Among the objects of my invention are: To cut pinion teeth or the like in a rod of indeterminate length; to cut the teeth in a stepwise fashion without elongation of the rod; to cut the teeth progressively from one end of the rod to the other; to push and pull the rod in a step-by-step manner through the plurality of dies of succeedingly smaller dimension in tandem; to form the individual pinions or the like by cutting the toothed rod into the desired lengths; to grip the rod ahead of and behind the dies and then to move the gripping means translatorily for pushing and pulling the rod through the dies; to grip the rod first and then move the gripping means in a forward direction, then to release the gripping means and thereafter return the same to repeat the cycle; to employ a hydraulic power unit for gripping the rod at each point; to employ a hydraulic power unit for shifting the clamping means forward and back; and to operate the hydraulic power units sequentially, first to grip the rod, next to move the rod forwardly through the dies, next to release the hydraulic unit which clamps the rod, and finally to return the clamping means to the initial position.

Other objects of my invention will, in part, be obvious and in part appear hereinafter.

Accordingly, my invention is disclosed in the embodiment thereof shown in the accompanying drawings and it comprises the features of construction, combination of elements, and arrangement of parts, which will be exemplified in the construction hereinafter set forth and the scope of the application of which will be indicated in the appended claims.

For a more complete understanding of the nature and scope of my invention, reference can be had to the following detailed description, taken together with the accompanying drawings, in which:

Figure 1 is a top plan view of a multiple broach machine in which my invention is embodied;

Figure 2 is a view, in side elevation, of the machine shown in Figure 1;

Figure 3 is a view, partly in section, which shows how the pinion teeth are gradually cut in a rod, the teeth being fully formed at the leading end and gradually diminishing in height to the other end;

Figure 4 is a detail sectional view, at an enlarged scale, taken along the line 4—4 of Figure 2;

Figure 5 is a detail sectional view taken along the line 5—5 of Figure 4;

Figure 6 is a detail sectional view, at an enlarged scale, taken along the line 6—6 of Figure 1;

Figure 7 is a detail sectional view, at an enlarged scale, taken along the line 7—7 of Figure 2;

Figure 8 is a top plan view of a number of the hydraulic power units that are employed for operating the clamping heads showing the manner in which the high pressure hydraulic connections are made thereto while permitting the same to be moved translatorily;

Figure 9 is a detail sectional view, taken along the line 9—9 of Figure 10 and showing the details of construction of the die block and the manner in which the die is mounted thereon;

Figure 10 is a detail sectional view, taken along the line 10—10 of Figure 9, showing further details of construction of the die block and the manner in which the die is mounted thereon;

Figure 11 is a view, in front elevation, of a typical die that may be employed in practicing this invention; and Figure 12 illustrates, diagrammatically, the hydraulic and electrical connections that can be employed in practicing this invention.

Referring now particularly to Figures 1 and 2 of the drawings, it will be observed that the reference character 10 designates, generally, a machine bed, such as the bed of a lathe, which is supported by suitable legs 11, 12 and 13. The machine bed 10, in accordance with the present invention, may be about 12 feet long. However, it will be understood that it may be longer or shorter as circumstances may dictate for a particular application of the invention. The machine bed 10 may be provided with a trough 14 for collecting a coolant fluid that is supplied to the cutting zone in a manner which will be described hereinafter.

The multiple broach machine may be powered by a hydraulic power unit 16 of the cylinder and piston type which may be mounted for horizontal operation at the left-hand end of the machine bed 10 by angularly directed support plates 17. The power unit 16 operates through a connecting rod 18 to move a yoke 19 that is attached thereto. A pair of rods 20 are secured to the yoke 19 and extend through movable clamping heads 21 that are arranged to move translatorily with the rod 20. As will appear hereinafter, the clamping heads 21 are arranged to clamp a rod 22 on opposite sides of stationary die blocks 23 for pushing and pulling the rod 22 therethrough without elongation. The rod 22 may be a round rod, the outer diameter of which equals the major diameter of the pinions or the like that are to be cut. It may be formed of brass or other alloys suitable for use in making pinions, ratchets, splines, keyways or the like. The rods 22 may be of indeterminate length. However, for convenience, they may be used in twelve foot lengths and fed through the stationary die blocks 23 by the movable clamping heads 21 as will be described hereinafter.

For cooling the cutting zones along the rod 22 a suitable coolant in the form of a liquid may be supplied from a suitable source through a conduit 26 that communicates with a distributing conduit 27 to which individual flexible conduits 28 are connected, as illustrated in Figures 1, 2 and 7 of the drawings. Each of the conduits 28 may have a nozzle 29 for directing the flow of the coolant to the cutting zones.

The hydraulic power unit 16 is energized for reciprocating the rods 20 and therewith the clamping heads 21 from a suitable source of hydraulic pressure. As will appear hereinafter, the application of hydraulic pressure is controlled both electrically and mechanically. It may be necessary to stop the operation of the machine from any position therealong. For this purpose an emergency operating rod 32 extends along the machine. It may be movably supported by links 33 and it may be arranged to operate a normally closed switch 34.

The necessary pressure for operating the hydraulic power unit 16 and for operating certain additional hydraulic power units which will be referred to hereinafter, may be obtained from a suitable pump 35, Figure 1, that may be driven by a motor 36. The hydraulic fluid for operating the system may be pumped from and returned to a suitable sump 37 on which the motor 36 and pump 35 driven thereby may be mounted.

The motor 36 may be started and stopped independently of the control of the hydraulic system. For this purpose a start switch 38 and a stop switch 39 may be mounted at a convenient location on the machine bed 10, as illustrated in Figure 2. The hydraulic system can be controlled by a start switch 40 and a stop switch 41 located nearby. The details of the electrical circuit and of the hydraulic system are shown in Figure 12 and will be described after a description of the machine itself has been set forth.

Before describing in detail how the teeth for pinions, ratchets, splines, keyways or the like are cut in the rod 21, reference may be had to the illustration of the rod 22 in Figure 3, which shows the appearance of the rod while it is passing through the several stationary die blocks 23. It will be understood that the rod 22 is fed into the machine from the right-hand end as viewed in Figures 1 and 2. The initial cut at the right-hand end on the rod 22 is indicated at 42 in Figure 3. As the rod progresses through the die blocks 23, the cut is increased at each station, which corresponds to a die block 23 until, as indicated at 43, the pinion teeth are fully formed.

In practicing the present invention it has been found desirable to employ 24 stations corresponding to 24 die blocks 23. A corresponding number of movable clamping heads 21 is employed. However, it will be understood that a larger or smaller number of stations can be used, depending upon the circumstances.

Referring now particularly to Figures 4 and 5 of the drawings, it will be observed that the machine bed 10 includes side members 44 and 45 which extend the entire length of the machine. Each movable clamping head 21, which is secured to and moved by the rods 20 relative to the side members 44 and 45, carries a clamp block 46 which may be accurately positioned thereon by dowel pins, one of which is indicated at 47. Each clamp block 46 may be secured to its individual clamping head 21 by counter-sunk screws, one of which is indicated at 48. Each clamp block 46 has a transversely extending slot 49 which permits the lower portion 50 thereof to be flexed relative to the upper portion of the clamp block 46 which is held rigid. The clamp block 46 is apertured to receive a split clamp bushing the halves of which are indicated at 51 of Figure 5. The parts making up the clamp bushing 51 may be held in place by suitable set screws 52.

The internal diameter of the split clamp bushing 51 is the same as the external diameter of the rod 22. When a different diameter of rod 22 is machined, a different set of clamp bushings 51 is used. The slot 49 in the clamp block 46 and the spacing between the halves 51 of the clamp bushing are such that, when the lower portion 50 of the clamp block 46 is flexed upwardly, the rod 22 is securely clamped between the parts of the clamp bushing 51. For this purpose a hydraulic power unit 53 of the cylinder and piston type is provided underneath each of the clamping heads 21 and is movable therewith. Each power unit 53 operates through a connecting rod 54 that bears against the underside of the portion 50 of the clamp block 46. Each power unit 53 is arranged to have a stroke of about 1/16 inch.

As illustrated in Figure 8, the hydraulic power units 53 are arranged in groups of three and interconnected by suitable conduits 55. A flexible conduit 56 interconnects the intermediate power unit 53 of each group to the main conduit 57 to which hydraulic fluid under pressure is supplied through suitable control means from the pump 35. This arrangement permits the use of a single flexible conduit 56 for three of the power units 53, thereby reducing the number that would otherwise be required if a flexible conduit were provided for each of the power units 53.

As illustrated in Figure 4, the conduits 27 and 57 extend along the side member 44 and may be secured in spaced relation therealong by clamps 58 and 59 that may be held by bolts 60 extending into the side member 44.

As illustrated in Figure 6 of the drawings, the rods 20 are provided with sleeves 64, one sleeve for each clamping head 21. Each sleeve 64 has an end section 65 of reduced diameter which has a press fit with the clamping head 21 associated therewith. The sleeves 64 are placed in end-to-end relation on the rods 20 between the yoke 19 at the left-hand end and the nut at the right-hand end. In this manner the clamping heads 21 are held in accurate spaced relation for conjoint movement on operation of the power unit 16. The power unit 16 is arranged to have a stroke of about 2 inches so that the clamping heads 21 move the rod 22 forwardly through about this distance on each forward stroke of the power unit 16.

Also as illustrated in Figure 6 of the drawings, the sleeves 64 are slidably mounted in bushings 66 that are located in the stationary die blocks 23. The stationary die blocks 23 then serve as guides for the rods 20 and the clamping heads 21.

Referring now to Figure 7 of the drawings, it will be observed that the upper portions of the side members 44 and 45 are provided with ways 68 and 69 to which the stationary die blocks 23 may be clamped by suitable bolts 70 that extend into a clamp plate 71 individual to each die block 23. The ways 68 and 69 are accurately machined so that the die blocks 23 can be located in exact alignment therealong and clamped in place as described. A suitable lubricant may be supplied to the bushings 66 through grease fittings 72 located on the upper side of each die block 23. The die blocks 23 additionally are held in aligned spaced relation by through bolts 73 with which tubular spacers 74 cooperate. As illustrated in Figure 6, the spacers 74 are positioned between the adjacent faces of the die blocks 23 and the bolts 73 extend through them and through the die blocks 23.

The manner in which the cutting dies are mounted in the die blocks 23 is illustrated in Figures 9 and 10 of the drawings. As there shown, each die block 23 is apertured, as indicated at 77, for receiving a sleeve 78 that surrounds an inner guide bushing 79. The inner guide bushing 79 bears against the rear side of a cutting die 80 and both are held in place by an outer guide bushing 81 that may be secured to the die block 23, by bolts 82, Figures 7 and 9. The lower portion of the cutting die 80 is cut away to provide a flat surface as indicated at 83 for cooperating with a locating block 84 having a corresponding surface and which is held in place in the die block 23 by suitable screws 85 and 85' and a dowel pin 86. In this manner the cutting dies 80 are accurately located in alignment and the teeth 87 thereof are also located in exact alignment.

It will be understood that each cutting die 80 is of slightly smaller dimension for each of the succeeding stations from the right-hand end of the broaching machine to the left-hand end. As indicated in Figure 11, the major diameter 88 of the teeth 87 is the same for each of the cutting dies 80. However, the minor diameter 89 for the teeth 87 is the variable factor. The minor diameter 89 varies from a maximum for the cutting die 80 in the first station at the right-hand end of the machine to a minimum for the last or twenty-fourth station at the left-hand end of the machine. Thus, the cutting dies 80 for the succeeding stations are of succeedingly smaller dimension, the difference residing in the gradual decrease in the minor diameter 89 for the teeth 87 of each of the succeeding cutting dies 80. Of course, the dimensions and number of teeth 87 will vary in accordance with the size and number of pinion teeth that are required for the finished pinions.

It will now be understood, that in order to cut pinion teeth on the rod 22, the appropriate cutting dies 80 of gradually decreasing dimension are placed and secured in the stationary die blocks 23. The split clamp bushings 51 of proper size are located and secured in the movable clamping heads 21 by placing the same in the clamp blocks 46. The rod 22 is then fed into the machine from the right-hand end and first is clamped in the right-hand clamping head 21 by the hydraulic power unit 53 individual thereto. It will be understood that all of the hydraulic power units 53 are simultaneously operated but, initially the rod 22 is only gripped by the first clamping head 21. Thereafter, the power unit 16 is energized to move all of the clamping heads 21 through the forward stroke. Accordingly, the rod 22 is pushed through the first stationary die block 23 and the initial formation of the teeth takes place on the rod 22 as indicated at 42 in Figure 3. The first cutting die 80 frictionally grips the rod 22 sufficiently to hold the rod stationary when the first clamping head 21 is unclamped and subsequently the hydraulic unit 16 moves it and the other clamping heads 21 through the back stroke. This cycle of operations is repeated and the rod 22 is moved in a stepwise fashion through the cutting dies 80 of the stationary die blocks 23. When the rod 22 has moved past the first die block 23, it can be gripped on opposite sides thereof by the first and second clamping heads 21. On the next forward stroke of the hydraulic unit 16, the rod 22 is not only pushed through the cutting die 80 of the first station but also is pulled therethrough. Because of this combined pushing and pulling action no elongation of the rod 22 takes place. As the rod 22 progresses through the several stations, it is individually pushed and pulled through each one. Since the rod 22 is securely clamped at each station and no slippage occurs, the force applied by the power unit 16 during the forward stroke is individually applied at the corresponding points along the rod 22. As a result, no elongation of the rod 22 takes place and the pinion teeth, as indicated at 43 in Figure 3 of the drawings, are accurately formed.

After the pinion teeth 43 have been cut in the rod 22 the individual pinions may be formed by suitably transversely cutting the rod 22 up into the desired lengths to provide the required length of pinion. This cutting operation may be performed in any suitable manner, such as by a suitable cutting wheel or saw or by a shearing operation.

Various control means may be employed for effecting the sequential operation of the hydraulic power units 16 and 53 to move the rod 22 through the cutting dies 80 in a step-by-step manner. It is required that provision be made for first energizing the hydraulic units 53 individual to the clamping heads 21 for securely clamping the rod 22 on opposite sides of the stationary die blocks 23. Only after this is accomplished is the hydraulic power unit 16 energized to move the clamping heads 21 with a translatory movement to simultaneously push and pull the rod 22 through the cutting dies 80.

At the end of the forward stroke and before the power unit 16 is reversed to effect the return stroke, the power units 53 are deenergized by release of hydraulic pressure therefrom to unclamp the rod 22. Thereafter the hydraulic unit 16 is energized in the reverse direction to return the clamping heads 21 to the initial position, whereupon the cycle can be repeated.

In Figure 12 are illustrated the electrical and hydraulic connections and apparatus that can be used for controlling the sequential operation of the hydraulic units 16 and 53 in the manner just described. As there shown, a relay 92 can be provided for controlling the energization of the motor 36. It will be noted that the motor 36 is a three phase motor and that it may be energized from a suitable three phase circuit, which is indicated by conductors L1—L2—L3. These conductors may be connected to a suitable three phase alternating current source, such as a 60-cycle source, operating at 220 volts between phases. The relay 92 may be provided with normally opened contacts 92a—92b—92c. Also it may be provided with an operating winding 93, the energization of which is controlled by the start and stop switches 38 and 39.

For starting the motor 36, it will be obvious that when start switch 38 is closed, a circuit is completed through normally closed stop switch 39 for energizing the winding 93 from conductors L1—L3. A holding circuit is provided for the winding 93 when the contacts 92a are closed. The motor 36 can be deenergized merely by operating the stop switch 39. This opens the energizing circuit to the winding 93 and the relay 92 automatically operates to the open position.

For controlling the hydraulic system relays 94 and 95 may be employed. Relay 94 is provided with normally opened contacts 94a—94b and an operating winding 96. Likewise relay 95 may have normally opened contacts 95a—95b and an operating winding 97. The relay 95 at the contact 95a is arranged to control the energization of the solenoid valve 98 which, when deenergized, is in the open position. When the solenoid valve 98 is deenergized, hydraulic pressure from the pump 35 is not permitted to build up in the relief valve 99. Rather, the hydraulic fluid circulates through the relief valve 99 back to the sump 37.

The functioning of the hydraulic system may be controlled by a four way pilot valve 100 which has operating arms 101 and 102 that are arranged to be engaged by operating fingers 103 and 104, respectively, which may be commonly mounted on a support 105 that, in turn, is secured to one or more of the clamping heads 21. It will be understood that the pilot valve 100 is reversed at the ends of the forward and reverse strokes of the clamping heads 21 to effect the reciprocatory movement thereof. The operating finger 103 is an extension of a plate 106 which has an inclined surface 107 for engaging a roller 108 to open a normally closed limit switch 109. As will appear hereinafter, the limit switch 109 is provided to insure that the clamping heads 21 will always be returned to the end of the return stroke when the stop switch 41 is operated.

When the solenoid valve 98 is energized on energization of the relay 95, fluid pressure builds up through a check valve 111 and into a control valve 112. Thence, the hydraulic fluid flows to a sequence valve 113 which is arranged to energize the hydraulic power units 53 through a reducing valve 114 prior to application of fluid pressure to the hydraulic unit 16 for moving the clamping heads 21 through the forward stroke. The control valve 112 is controlled by the pilot valve 100 to cause the hydraulic fluid to flow through a check valve 115 and a flow control valve 116 for energizing the hydraulic power unit 16 to accomplish the return stroke of the clamping heads 21 after the pressure applied to the hydraulic units 53 for gripping the rods 22 has been relieved.

In operation, the motor 36 is energized in the manner described by operating the start switch 38. The pump 35 is driven to generate the required hydraulic pressure.

A pump (not shown) is then started to cause coolant to flow through the conduit 26, distribution conduit 27 and flexible conduits 28 to be discharged through the nozzles 29 into the passageway between the outer surface of the cutting die 80 and the inner surface of the central portion of the outer guide bushing 81. The start switch 40 is momentarily operated to complete obvious circuits for energizing operating windings 96 and 97 of the relays 94 and 95. Holding circuits are completed for these windings through contacts 94b and 95b, respectively. The holding circuit for winding 96 extends through the contacts of stop switch 41, while the holding circuit for winding 97 extends through the normally closed contacts of emergency switch 34 and contacts 94a of relay 94. On closure of contacts 95a, the energizing circuit for the solenoid valve 98 is completed, it is closed and hydraulic pressure is applied to the hydraulic system for operating it in the manner described.

As long as the solenoid valve 98 remains energized, the hydraulic operating unit 16 will reciprocate the clamping heads 21 under the control of the pilot valve 100. The sequence valve 113 controls the energization of the hydraulic power units 53 individual to the clamping heads 21 to insure the proper sequential operation.

In the event that the stop switch 41 is operated during the forward or reverse stroke of the clamping heads 21, it is desirable that they complete the cycle of operation and return to the end of the return stroke. It is for this purpose that the normally closed limit switch 109 is provided. When the stop switch 41 is operated, the holding circuit for the winding 96 of the relay 94 is opened and this relay operates to the open position. The holding circuit for the winding 97 through contacts 94a is opened. However, this holding circuit is completed through the normally closed contacts of the limit switch 109 which are in parallel of the contacts 94a. The limit switch 109 is opened only when the power unit 16 has operated the clamping heads 21 to the end of the return stroke. At that time the holding circuit for the winding 97 is opened and the relay 95 operates to the open position. Contacts 95a are opened and the energizing circuit for the solenoid valve 98 is opened. When the emergency stop switch 34 is operated, the broaching machine does not complete the cycle of operation. Rather, it is stopped immediately upon operation of the switch 34 by the rod 32. It will be observed that the normally closed contacts of the emergency stop switch 34 are connected in series with the contacts 94a and the contacts of the limit switch 109. Accordingly, as soon as the switch 34 is opened, the holding circuit for the winding 97 is opened, relay 95 operates to the open position and the solenoid valve 98 is deenergized.

While this invention has been described particularly with respect to the making of pinions, as indicated hereinbefore, it may be used for broaching teeth for ratchets, splines, keyways or any other like devices that have a similar pattern.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

I claim as my invention:

1. Means for cutting pinion teeth in a rod which comprises, in combination, a plurality of stationary die blocks positioned in tandem; a die carried by each die block, each die being of smaller dimension than the preceding die, a plurality of movable clamping heads each individual to a die block and positioned ahead of the same, a split clamp bushing carried by each clamping head for gripping the rod, a hydraulic power unit of the cylinder and piston type individual to each clamping head for operating the same to cause the rod to be gripped by each clamp bushing, operating means mechanically interconnecting said clamping heads whereby the same can be shifted with a translatory movement, a hydraulic power unit of the cylinder and piston type connected to said operating means, and means for applying hydraulic fluid pressure from a source thereof to said power units individual to said clamping heads for gripping the rod and thereafter to said power unit connected to said operating means for pushing and pulling the rod through said dies.

2. The invention, as set forth in claim 1, wherein means are provided for releasing the pressure from the hydraulic power units individual to the clamping heads at the end of the forward stroke of the hydraulic power unit connected to the operating means and for energizing the latter unit to return said clamping heads to their initial positions.

3. The invention, as set forth in claim 1, wherein the hydraulic power unit connected to the operating means moves the same through a distance about equal to the distance between the stationary die blocks to move the rod forwardly through the dies in a stepwise manner.

4. The invention, as set forth in claim 1, wherein the hydraulic power units are sequentially energized by first energizing the units individual to the clamping heads to grip the rod, then the unit connected to the operating means is energized to shift said clamping heads and push and pull the rod through the dies, then said units are deenergized at the end of the forward stroke of said unit to release the rod, and finally said unit is energized to shift said clamping heads back to their initial positions.

WILLIAM P. GALLAGHER.

REFERENCES CITED

The following references are of record in the file of this patent:

UNITED STATES PATENTS

| Number | Name | Date |
| --- | --- | --- |
| Re. 15,464 | Blanchard | Oct. 10, 1922 |
| 772,841 | Smith | Oct. 18, 1904 |
| 1,096,856 | Pederquist | May 19, 1914 |
| 2,102,071 | Hart | Dec. 14, 1937 |
| 2,234,728 | Gaines | Mar. 11, 1941 |